June 10, 1969     T. R. KELLEY     3,448,949
VIBRATION AND SHOCK ABSORPTION MOUNTING
Filed Aug. 4, 1967
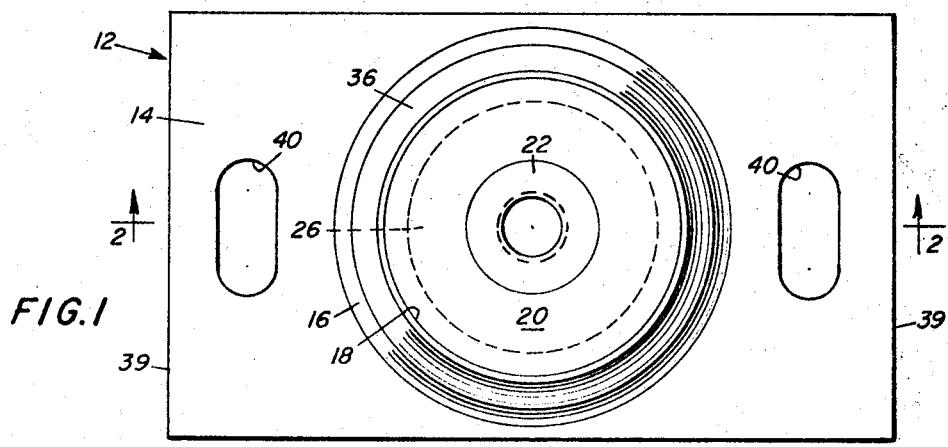
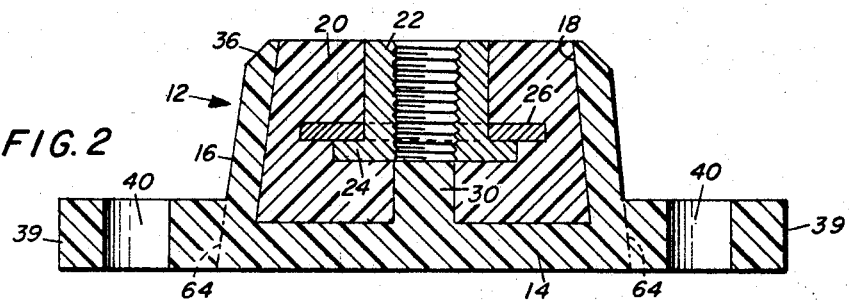
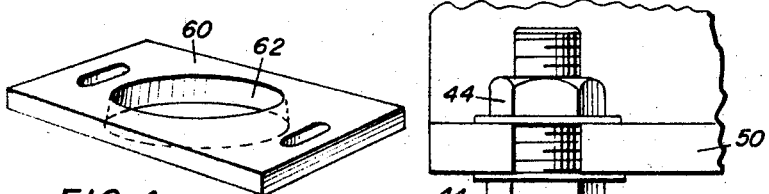
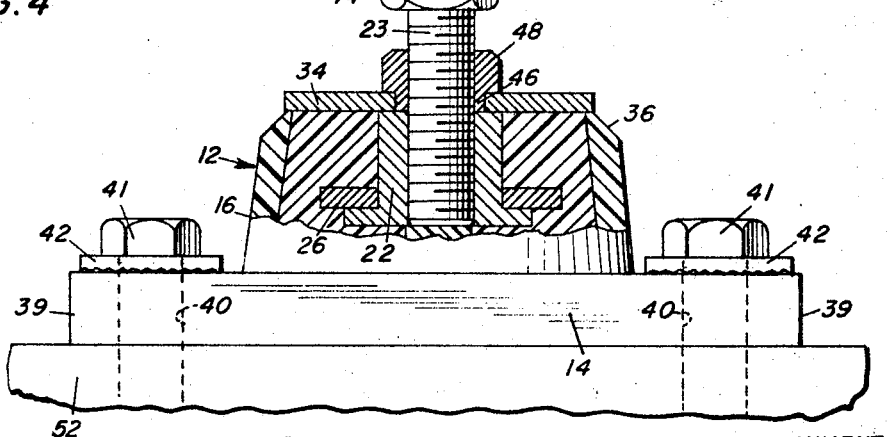
INVENTOR
THERON R. KELLEY
BY Robillard and Byrne
ATTORNEYS United States Patent Office
3,448,949
Patented June 10, 1969

3,448,949
VIBRATION AND SHOCK ABSORPTION MOUNTING
Theron R. Kelley, Mattapoisett, Mass., assignor to Tedan, Inc., West Hanover, Mass., a corporation of Massachusetts
Filed Aug. 4, 1967, Ser. No. 658,410
Int. Cl. F16f *15/08, 1/36;* F16m *5/00*
U.S. Cl. 248—9
7 Claims

ABSTRACT OF THE DISCLOSURE

A vibration and shock absorption mounting of the type interposed between a relatively movable member, such as an engine, and a rigid support therefor including a carrier member of relatively inactive elastomer having a receiving chamber enclosing the sides and bottom of a cushion member comprising a mass of relatively active elastomer, the contiguous surfaces of the carrier and receiving chamber being co-operatively contoured to retain the cushion member in the carrier, and associated means including a rigid connector insert axially arranged in the cushion member and having a peripheral flange thereon to wedge the cushion member against the carrier upon upward movement of the connector insert, a compression restrictor of the like material to the carrier positioned to limit downward movement of the connector insert, a compression member overlying the carrier and cushion member to transmit forces to the carrier wall, and a connector mounted in the connector insert carrying means positioning the compression member.

---

The invention disclosed herein is an improved resilient mounting of the type interposed between a body which produces vibrations and shock, and the supporting means for such a body.

It is recognized that resilient mountings are old in the art, and are particularly directed toward vibration damping. Such mountings are most frequently used in conjunction with a driving device, such as an internal combustion engine, and are subjected to what may be broadly considered as shock forces upon starting, stopping, and reversing, which forces are often beyond the absorption capacity of the mounting.

The main object of the invention herein is a mounting combining into a single unit both vibration and shock absorption characteristics by the utilization of an elastomer of relatively high activity for normal vibration in combination with an elastomer of relatively low activity together with rigid means whereby when excessive vibrations or shock occur the elastomers co-act to substantially absorb the forces and prevent transmission thereof to the structure supporting the mounting.

More specifically, the mounting herein comprises an elastomer cushion member of relatively high activity wholly contained within a carrier member of relatively inactive elastomer, the carrier having a receiving chamber enclosing the sides and bottom of the cushion member. Secured within the cushion member is a rigid connector which extends upwardly therefrom and a rigid compression member positioned by the connecting member to overlie the cushion member and upper end of the carrier, and a compression restrictor of like elastomer to the carrier extending upwardly through the cushion member and aligned with the inner end of the connector.

A further object is a mounting which particularly lends itself to use with an internal combustion engine, in that the engine brackets are not supported directly on the mount, but in effect suspend the engine, permitting adjustments to compensate for misalignment in the brackets, the supporting frame or engine bed.

The foregoing and other objects and advantages will become apparent from the description herein, read in light of the accompanying drawings, wherein:

FIGURE 1 is a plan view of the mounting;
FIGURE 2 is a vertical section taken on line 2—2 of FIGURE 1;
FIGURE 3 is a view partly in section showing the mounting as used to support an internal combustion engine; and
FIGURE 4 is a perspective of a positioning plate which may be used in conjunction with the mounting.

Referring to the drawings wherein like parts are given like numbers, the mounting includes a container like carrier member 12, which in the preferred embodiment is illustrated as a support for an internal combustion engine, and is made of a relatively inactive elastomer, herein being polyurethane, having a durometer hardness of 75 on the D scale.

The carrier 12 has a cylindrical base 14 and an upwardly extending peripheral side wall 16 thus providing an inner receiving chamber 18 which is closed at the bottom and open at the top. The wall 16, at least on its inner side, is inclined inwardly from the base to its upper end, whereby the top opening of the carrier chamber is of less cross sectional area than the bottom. The carrier chamber thus has the shape of a frustrum of a cone, this shape being selected for reasons hereinafter apparent.

Carried within the receiving chamber 18 is what may be termed a cushion member 20, in that it is a mass of relatively active elastomer herein being of polyurethane having a durometer hardness of 95 on the A scale.

The cushion member 20 has the same shape as the receiving chamber, that is, it is also frustro conical and because of the co-operating contoured walls is interlocked in the carrier. The interlock is further strengthened by having the contiguous surfaces of the cushion member and carrier bonded to one another. The selection of the frustro conical shape also adds to ease of manufacture, it being apparent that other shapes could be used if the contiguous walls are co-operatively contoured to interlock the cushion member in the carrier and in a manner whereby upon application of tension the cushion member wedges against the carrier.

The cushion member 20 fills the receiving chamber 18, except for an axially arranged internally threaded connector insert or bushing 22 bonded into the cushion member; and a compression restrictor 30 which is integral and of like material to the base 14, and extends vertically through the cushion member to the lower end of bushing 22, and has the same cross sectional area as the bore of the bushing.

Referring to the connector 22, its upper end is flush with the top surface of cushion member 22, which is level with the upper edge of carrier wall 16, and its lower end is slightly below the horizontal center plane of the cushion member. The lower end of the connector is provided with a peripheral flange 24 whereby if a tension force is exerted on the connector, the flange will act against the cushion and wedge it against the carrier wall setting up an opposite force with the flange acting as a tension resisting member. The connector shown is of standard make, and to avoid the necessity for a non-standard make, but increase the effective resistance to a tension force, a member 26 is added, this member simply being a washer of substantial diameter having a central opening permitting it to seat on the flange 24. In this way the surface area of the flange in engagement with cushion member 20 is substantially increased with a resultant increase in effectiveness. The functioning of the compression restrictor 30 is best seen from FIGURE 3, wherein a stud connector 23 is threadly positioned in the connector insert 22, the stud's lower end either abutting or being a fraction above the top of restrictor 30, whereby if a sudden compression force is transmitted through the stud, the restrictor 30 and the carrier 12, thus limiting the action on cushion member 20.

There is further provided an upper compression member 34, which overlies the top of the carrier wall and the top of the cushion member, being positioned in place by a nut 48 on stud 23. Member 34 is provided with a central opening of sufficient size to receive a centering pilot 46 which depends from the nut 48, the pilot being of lesser depth than the thickness of member 34, so that it does not engage the connector insert 22.

It is thus seen that if a compression force is transmitted through member 34 onto the carrier wall and the cushion member, the shock is distributed throughout the mounting. To increase the shock resistance and to also compensate for shear, the upper end of carrier wall 16 is reduced in width to provide a narrow edge 36 immediately adjacent the cushion member top surface. The narrow edge will, upon application of force, tend to further flatten out and provide further absorption by the carrier as well as compensate for shear.

As previously stated, an advantage herein is that of vertical adjustability. With the mounting positioned and secured on the frame or bed 42 (FIGURE 3), a flanged, self-locking nut 44 is spaced on stud 23 above and out of contact with the mounting. The engine bracket 50 is positioned on nut 44, which may then be adjusted to align the engine. When adjusted a second flanged self-locking nut 52 is positioned onto the stud and locked against the bracket.

When used as an engine mounting, the carrier is provided with webs 39 connected to the base 14, herein being integral therewith and of like material. The webs together with the base 14 define a positioning plate of substantial cross-sectional area which further assists in the dissipation of forces and noise reduction.

The webs 39 are each provided with a transverse oblong opening 40 for the insertion of hold-down bolts 41, the oblong openings permitting transverse adjustment of the mounting on the frame. Locking washers 42 with serrated lower faces may be used to assure firm locking of the mounting in position.

As the carrier and cushion are elastomers, corrosion is reduced, and to minimize it, all the other metal parts are preferably made of stainless steel, cadmium or similar materials.

From the foregoing it can be seen that normal vibrations are absorbed by the cushion member 20, whereas when abnormal forces are applied, not only does the cushion member become active, but the carrier becomes active. Moreover as the cushion member is enclosed by the carrier, the application of unusual forces will not overload, tear, or distort the cushion member to a degree which causes it to lose its dampening effectiveness.

The mounting has been described as used with an internal combustion engine and it will generally be subject to most extreme conditions in this environment. It can be understood from the teachings herein that many other applications are possible, and also from the teaching that the active cushion member is of a material which will dampen the normal vibrations, and the carrier of a material which combines with the cushion member and force transmitting means to absorb shock forces.

As is also apparent, the carrier can, in many applications, be secured to a supporting frame by any well known bonding agent, or for home washing machines or the like be the foot rest.

Because of some installation problems a separate positioning plate as shown in FIGURE 4 may be used. The plate 60 may be of any suitable material and provided with a central opening 62 having a downwardly and outwardly tapering wall whereby it may be placed over and brought down on the carrier 12 to engage a corresponding taper on the base 14 thereof, as indicated by the dotted lines 64 in FIGURE 2. The dimensions of the tapers should preferably be such that a jam fit will result.

Because elastomers are used, the mounting is suitable for use in a non-magnetic environment. In this instance the associated metal parts may be replaced by suitable rigid plastic parts.

The mounting having been described, the patentable subject matter is defined in the following claims.

I claim:

1. A vibration and shock absorbing mounting of the type interposed between a relatively movable member and a support therefor comprising:
   (a) first and second elastomer members, the first of high activity adapted to be secured to the movable member, and the second an open top container-like carrier of low activity adapted to be carried on the support;
   (b) the first elastomer member being wholly contained in the second elastomer member;
   (c) rigid connector means secured in the first elastomer member and extending outwardly therefrom for connecting the first elastomer member to the relatively movable member; and
   (d) rigid compression means associated with the rigid connector means and positioned thereon to overlie the open top of and engage said second elastomer member.

2. The mounting defined in claim 1 wherein said rigid connecting means is an insert secured in said first elastomer member and a stud carried in the insert and extending upwardly therefrom.

3. The mounting defined in claim 2 wherein said rigid compression means associated with the rigid connector means is a plate member positioned on the stud to engage said second elastomer member.

4. A vibration and shock absorption mounting including:
   (a) a carrier of relatively inactive elastomer having a base and side wall extending upwardly therefrom to define an open end receiving chamber;
   (b) a cushion member of a relatively active elastomer contained in the carrier receiving chamber, the contiguous walls of the cushion member and chamber being co-operatively contoured to retain the cushion member in the chamber;
   (c) a rigid connector insert axially positioned in the cushion member; and
   (d) a compression restrictor integral with and of like material to the carrier extending upwardly from the base of the receiving chamber through a cushion opening and in axial alignment with the connector insert.

5. A vibration and shock absorption mounting including:
   (a) a carrier of relatively inactive elastomer having a base and side wall extending upwardly therefrom to define an open end receiving chamber;
   (b) a cushion member of a relatively active elastomer contained in the carrier receiving chamber, the contiguous walls of the cushion member and chamber being co-operatively contoured to retain the cushion member in the chamber;
   (c) a rigid connector insert axially positioned in the cushion member;
   (d) a rigid compression member positioned on the upper end of the carrier side wall and overlying the cushion;
   (e) said member having a central opening therethrough;
   (f) rigid connector extending through the opening and engaged in the connector insert; and
   (g) means on the connector holding the compression member in position.

6. The mounting defined in claim 3 including a compression restrictor of like material to the carrier and extending upwardly from the bottom thereof through the cushion member and aligned with the lower end of the rigid connector.

7. A vibration and shock absorption mounting comprising:
   (a) an exterior carrier of relatively inactive elastomer having a base and side wall extending upwardly therefrom to define an open end receiving chamber;
   (b) a cushion member of relatively active elastomer wholly contained in the carrier receiving chamber and with its bottom and side wall contiguous with the wall of the carrier receiving chamber and its top wall flush with the upper edge of the side wall of the carrier;
   (c) a rigid connector axially secured in the cushion member and extending outwardly therefrom;
   (d) a rigid compression plate overlying and engaging the cushion member and the upper end of the side wall of the carrier, said plate having an opening therethrough with the rigid connector extending through said opening; and
   (e) means on the connector engaging and positioning said compression plate on said carrier member and cushion.

References Cited
UNITED STATES PATENTS

| | | | |
|---|---|---|---|
| 2,106,737 | 2/1938 | Haire | 248—22 XR |
| 2,457,058 | 12/1948 | Markowitz | 248—24 |
| 3,254,883 | 6/1966 | Morgan | 267—1 |
| 3,346,221 | 10/1967 | Farmer | 248—24 |

ROY D. FRAZIER, *Primary Examiner.*

J. F. FOSS, *Assistant Examiner.*

U.S. Cl. X.R.

248—22, 24; 267—1